(12) United States Patent
Zhou

(10) Patent No.: US 11,590,856 B2
(45) Date of Patent: Feb. 28, 2023

(54) ROBOTIC CAR CHARGER ATTACHMENT APPARATUS

(71) Applicant: Wesley Zhou, Aliso Viejo, CA (US)

(72) Inventor: Wesley Zhou, Aliso Viejo, CA (US)

( * ) Notice: Subject to any disclaimer, the term of this patent is extended or adjusted under 35 U.S.C. 154(b) by 119 days.

(21) Appl. No.: 17/321,207

(22) Filed: May 14, 2021

(65) Prior Publication Data

US 2022/0363156 A1 Nov. 17, 2022

(51) Int. Cl.
| | | |
|---|---|---|
| *B60L 53/34* | (2019.01) | |
| *B25J 19/00* | (2006.01) | |
| *B60L 53/36* | (2019.01) | |
| *B25J 18/04* | (2006.01) | |
| *B25J 15/02* | (2006.01) | |
| *B25J 18/06* | (2006.01) | |

(52) U.S. Cl.
CPC ............ *B60L 53/34* (2019.02); *B25J 15/0246* (2013.01); *B25J 18/04* (2013.01); *B25J 18/06* (2013.01); *B25J 19/0025* (2013.01); *B60L 53/36* (2019.02)

(58) Field of Classification Search
CPC ........ B25J 19/0025; B25J 18/06; B25J 18/04; B25J 15/0246; B60L 53/36; B60L 53/34
See application file for complete search history.

(56) References Cited

U.S. PATENT DOCUMENTS

| | | | | |
|---|---|---|---|---|
| 6,382,269 | B1 * | 5/2002 | Tatsuno | B67D 7/0401 |
| | | | | 141/192 |
| 9,056,555 | B1 | 6/2015 | Zhou | |
| 2013/0193919 | A1 * | 8/2013 | Hill | B60L 5/42 |
| | | | | 320/109 |
| 2019/0231160 | A1 * | 8/2019 | Lu | A47L 11/4011 |
| 2020/0022553 | A1 * | 1/2020 | Gill | A47L 9/1436 |
| 2020/0275815 | A1 * | 9/2020 | Furuta | A47L 9/2852 |
| 2021/0197683 | A1 * | 7/2021 | Graham | B60L 53/37 |
| 2021/0197684 | A1 * | 7/2021 | Graham | B25J 19/0029 |
| 2021/0198093 | A1 * | 7/2021 | Graham | B60L 53/36 |

FOREIGN PATENT DOCUMENTS

EP 0 834 978 A1 4/1998

* cited by examiner

*Primary Examiner* — David M Fenstermacher
(74) *Attorney, Agent, or Firm* — Lapple Ubell IP Law, LLP; Franklin D. Ubell

(57) ABSTRACT

An attachment module constructed to enable a vehicle charging robot to attach to a vehicle and to thereafter insert its charging connector into the vehicle's charging socket. Once the vehicle is charged and the charging connector is disconnected from the charging socket, the attachment module is further constructed to enable the robot to detach from the vehicle.

29 Claims, 3 Drawing Sheets

ROBOTIC CAR CHARGER ATTACHMENT APPARATUS

FIELD OF THE DISCLOSURE

The subject disclosure relates to methods and apparatus for robotically charging electric vehicles and more particularly to apparatus which facilitates the establishment of electrical connection between a robot charging connector and a charging socket of an electrically powered vehicle by attaching the robot to the vehicle prior to charging. Electric vehicles may include, inter alia, vehicles which are powered in whole or in part by one or more electric motors or other electric powered means.

DESCRIPTION OF RELATED ART

Robotic vehicle charging apparatus has been disclosed in the past, for example, as illustrated in the inventor's U.S. Pat. No. 9,056,555 entitled "Vehicle Charge Robot," the contents of which is incorporated by this reference herein in its entirety.

SUMMARY

According to illustrative embodiments, one end of a pipe or arm is mountable to a vehicle charging robot, and an attachment module is attached to the opposite end of the pipe or arm. According to an illustrative embodiment, the attachment module is constructed to enable the robot to attach to the vehicle and to thereafter insert its charging connector into the vehicle's charging socket. Once the vehicle is charged and the charging connector is disconnected from the charging socket, the attachment module is further constructed to enable the robot to detach from the vehicle.

In one illustrative embodiment, the attachment module comprises a flexible body having a flexible outer sleeve constructed to enable vacuum attachment of the body to a non-ferrous vehicle surface and further comprises an electromagnet mounted within the flexible body and actuatable to enable attachment to a ferrous vehicle surface. In an alternate embodiment, the electromagnet may be omitted and the flexible body alone employed to attach to both ferrous and non-ferrous vehicle surfaces.

Accordingly, another embodiment may comprise an apparatus comprising a hollow curved arm mountable at one end to a vehicle charging apparatus and an attachment module attached to said arm and comprising a flexible body having a flexible circular outer sleeve constructed and positioned to enable vacuum attachment of the flexible body to a vehicle.

According to another aspect, a method of charging an electric vehicle is provided comprising constructing an attachment module and charging the vehicle by first attaching the attachment module to the vehicle and then inserting a charging connector into a charging socket of the vehicle. The method may further include disconnecting the charging connector from the vehicle charging socket and thereafter detaching the attachment module from the vehicle. In one embodiment the attachment module may be constructed to comprise a vacuum attachment component and an electromagnetic attachment component, while in another embodiment the electromagnetic attachment component may be omitted.

DETAILED DESCRIPTION

Figure 1:
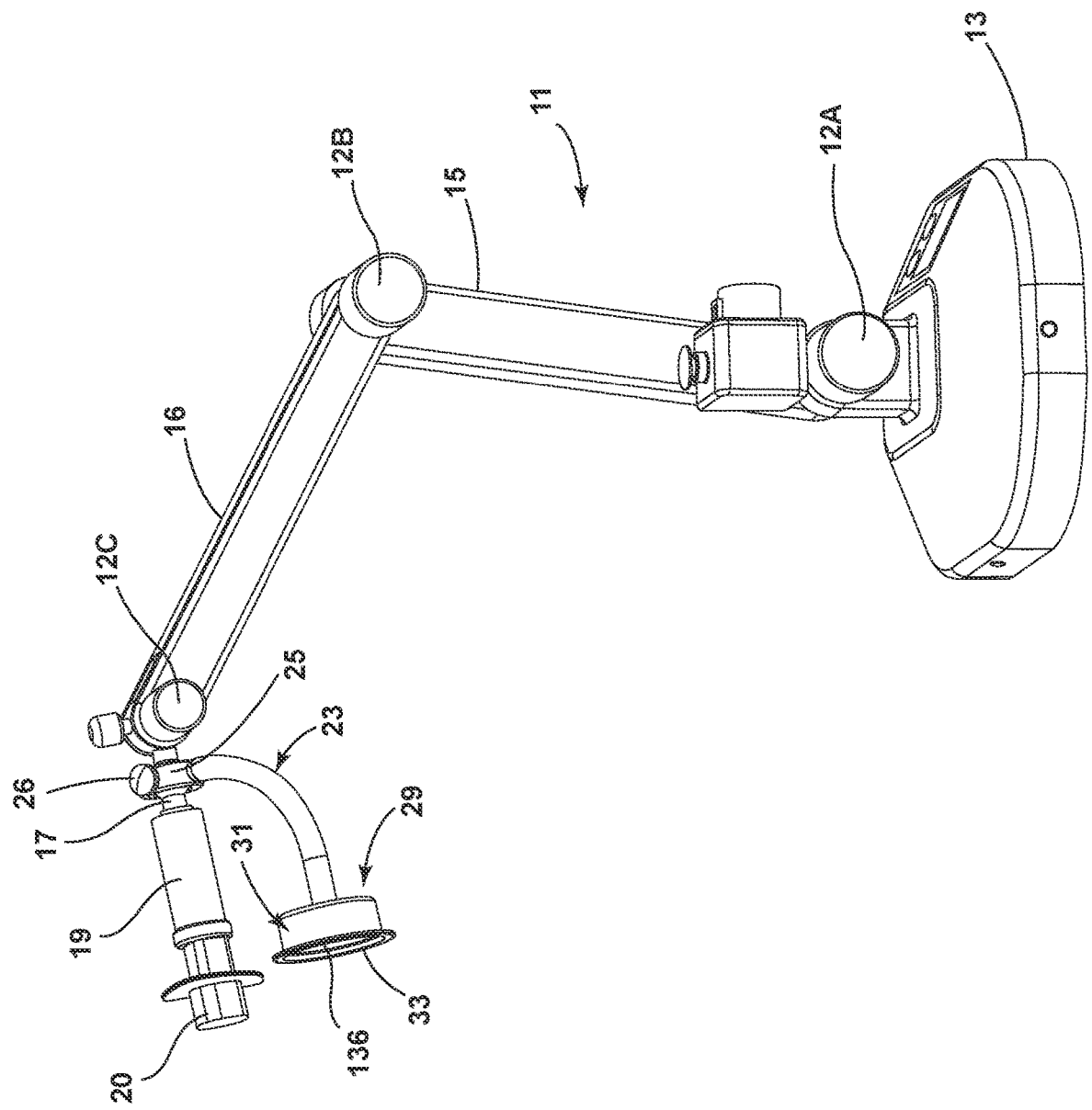
FIG. 1 is a perspective view of a vehicle charging robot according to an illustrative embodiment.

A vehicle charging robot 11 is illustrated in FIG. 1 and in one embodiment includes a self-propelled base 13, arms 15, 16, and positioning motor drive units 12A, 12B, 12C. In one embodiment, the robot 11 may be generally constructed and operated as described in U.S. Pat. No. 9,506,555 noted above. In the illustrative embodiment, the robot has an arm 17 which mounts a vehicle charging electrical connector 19 such that the connector 19 can slide axially in and out on the end of the arm 17. Inside the arm 17 is a motor 21 and a reduction gear 24 that powers this axial motion. In one embodiment, the arm travel distance may be 50-65 mm (millimeters) but may be different in other embodiments.

Figure 2:
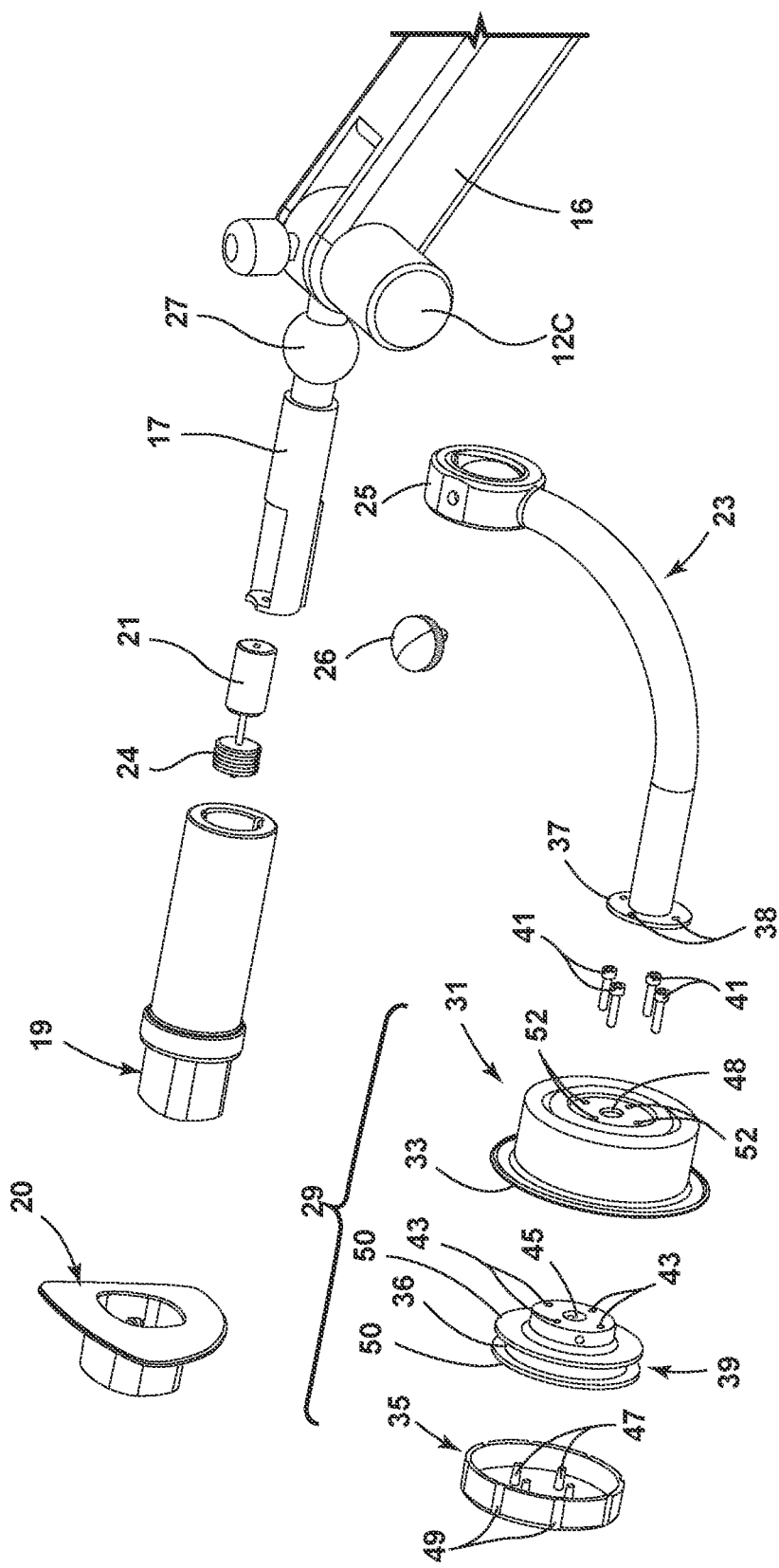
FIG. 2 is an exploded rear perspective view of a portion of the robot of FIG. 1 illustrating details of an attachment module for attaching the robot to a vehicle.
Figure 3:
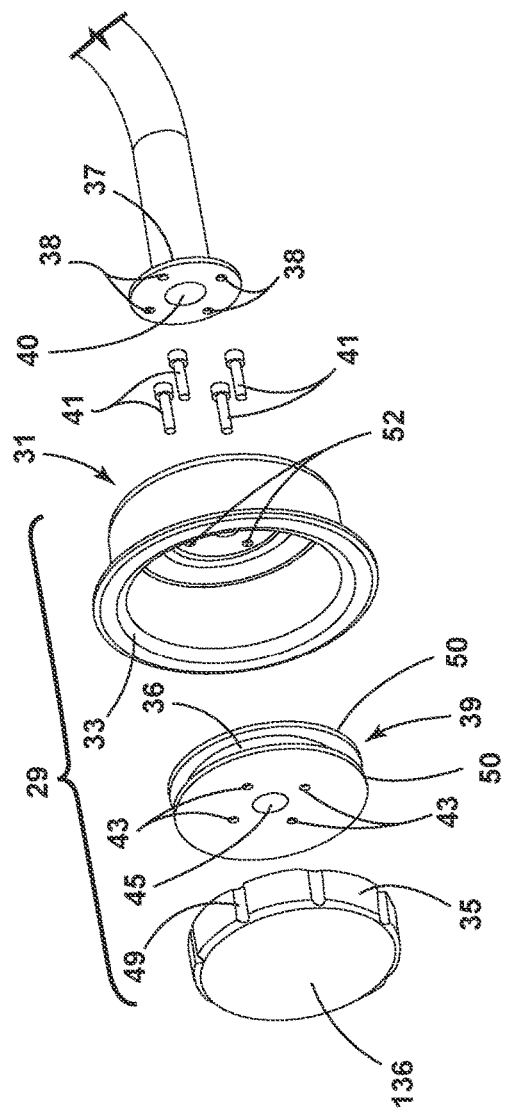
FIG. 3 is a partial exploded perspective view of the apparatus of FIG. 2 from a front perspective.
Figure 4:
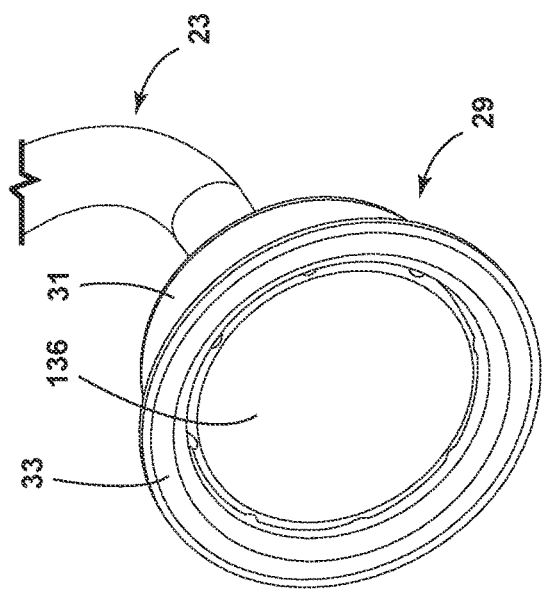
FIG. 4 is a partial front perspective view of an assembled attachment module according to an illustrative embodiment.

In one illustrative embodiment shown in FIGS. 2-4, a curved tubular pipe 23 extends from the arm 17 and has an attachment ring 25 at one end which is rotatably mounted on a ball joint 27 formed as part of the arm 17. The ball joint 27 provides the pipe 23 with the freedom to rotate around the charging connector's axial axis and then to be fixed in a desired position by a locking knob 26. In one embodiment, the ball joint 27 and ring 25 form a ball and socket connection providing three-dimensional x-y-z positioning.

At the opposite end of the pipe 23 is mounted an attachment module 29, which enables the robot 11 to attach itself to a car or other vehicle before the robot 11 can use its axial drive motor 21 to insert the charging connector 19 into a charging socket 20 of the electric vehicle to be charged. Such attachment to the vehicle enables a relatively lightweight robot 11 to exert sufficient force on the charging connector 19 to reliably insert the connector 19 into and extract it from the vehicle's charging socket 20.

In one illustrative embodiment, the attachment module 29 comprises a circular silicone rubber body 31, an electromagnet 39, and a silicone rubber pad 35, all of which are concentrically positioned with respect to one another. In one embodiment, the silicone rubber pad 35 may be about 75 mm in diameter, but may be of other diameters in other embodiments. The rubber body 31 has a circular flexible outer rubber sleeve or flange 33 similar to a toilet plunger, which facilitates vacuum attachment to the side of a vehicle.

The electromagnet 39 is mounted within the rubber body 31, and, in the illustrative embodiment, is an annular unit or bobbin with a channel 36 for receiving an electrical conductor winding. In other embodiments, the electromagnet 39 could be formed in other shapes and/or comprise two or more separate electromagnets. The protective circular silicone rubber pad 35 mounts on to outer circular rims 50 of the electromagnet 39. In the illustrative embodiment, the generated magnetic field lines are perpendicular to the surface of the outer face 136 of the rubber pad 35. The rubber body 31 and rubber pad 35 could be formed of other suitable materials in other embodiments.

As seen in FIG. 2, in an illustrative embodiment, the rubber pad 35 has bosses 47 extending from the inner surface of the outer face 136, which, in one embodiment, slidably fit into respective threaded holes 43 in the electromagnet 39. In this illustrative embodiment, a circular mounting plate 37 is unitarily formed as part of, or attached to, the curved pipe 23, and a plurality of bolts 41 are inserted through holes, e.g. 38, in the mounting plate 37, through suitable apertures 52 in the rubber body 31, and then threaded into the threaded holes 43 in the electromagnet 39 to hold the attachment module 29 together. Openings 40, 45, 48 in the mounting flange 37, electromagnet 39, and rubber body 31 and vents, e.g. 49, in the rubber pad 35 enable communication of suction force through the attachment module 29.

The just-described structure of the attachment module 29 enables the robot 11 to use electromagnetic force to attach, for example, to the side of steel bodied vehicles or, alternatively, to use a vacuum source to evacuate air from inside the rubber sleeve to attach the module 29 by suction to, for example, the side of vehicles constructed of aluminum. Thus, attachment of the robot 11 to the vehicle is achieved without mechanical fasteners by pressing the silicone rubber body against the vehicle side surface and then applying either suction or electromagnetic force. The vehicle paint is protected by a silicone rubber "pad" surface 136 between the electromagnet core and the car exterior. In an alternate embodiment, the electromagnet attachment mechanism can be omitted and the vacuum attachment mechanism used alone to attach to any particular vehicle side surface.

In one illustrative embodiment, the vacuum source may be a small commercially available vacuum pump that is turned on or off by the computer controller of the robot 11. In one embodiment, the pipe or arm 23 that connects between the attachment module 29 and the ball joint 27 is hollow and vacuum tight and can have a fitting formed on or attached to it to which a vacuum line of the vacuum pump can connect. Alternatively, a continuous vacuum hose can be mounted between the attachment module 29 and a vacuum source mounted in or on the robot 11 and routed along the outer surface of the pipe or arm 23.

In one embodiment, the winding of the electromagnet 39 is powered through two electrical conductors which can be routed through the hollow pipe or arm 23, or which can be routed externally to the robot 11. In an illustrative embodiment, the electromagnet 39 is switched on and off by the computer controller of the robot 11.

In operation, a user initially presets the position of the attachment module 29 for the particular vehicle by rotating the pipe or arm 23 and then fixing it in position using the knob 26. In an illustrative embodiment, the robot 11 is pre-programmed for the particular vehicle type, and the robot 11 determines whether vacuum or electromagnetic attachment will be employed.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. An apparatus comprising:
an arm mountable to a vehicle charging apparatus; and
an attachment module attached to an end of said arm and comprising: (a) a flexible body having a flexible outer sleeve constructed to enable vacuum attachment of the flexible body to a vehicle; (b) an electromagnet mounted within the flexible body and actuatable to enable attachment of the flexible body to a vehicle; and (c) a protective pad mounted on said electromagnet; wherein the apparatus is further constructed to enable a vacuum to be applied to said attachment module to cause it to attach by suction to a vehicle.

2. The apparatus of claim 1 wherein the flexible body and protective pad are formed of silicone rubber and wherein the outer sleeve is circular in shape.

3. The apparatus of claim 1 wherein the electromagnet comprises a bobbin having an electrical winding mounted in a channel thereof.

4. The apparatus of claim 2 wherein the electromagnet comprises a bobbin having an electrical winding mounted in a channel thereof.

5. The apparatus of claim 1 wherein said arm is mountable to enable rotation about a charging axis of the vehicle charging apparatus.

6. The apparatus of claim 1wherein said arm is mountable on a ball joint positioned on said vehicle charging apparatus.

7. The apparatus of claim 1 wherein said arm is curved such that a portion thereof lies parallel to an axis of a charging connector of the vehicle charging apparatus.

8. An apparatus comprising:
a hollow curved arm mountable to a vehicle charging apparatus and having a flange positioned at an opposite end thereof;
an attachment module attached to said flange and comprising: (a) a flexible body having a flexible circular outer sleeve constructed to enable vacuum attachment of the flexible body to a vehicle; (b) an electromagnet mounted within the flexible body and actuatable to enable attachment of the flexible body to a vehicle surface; and (c) a protective pad mounted around said electromagnet and having a front protective surface positioned to contact a surface of a vehicle;
the attachment module further comprising a plurality of mechanical fasteners each inserted through said mounting plate, through one of a respective one of a plurality of apertures in a back surface of said flexible body, and threaded into a respective one of a plurality of apertures in said electromagnet.

9. The apparatus of claim 8 wherein the plurality of apertures of said electromagnet extend entirely through said electromagnet and wherein an inner surface of a front face of said protective pad has a plurality of bosses formed thereon, each of which slidably fits into a respective one of the plurality of apertures in said electromagnet on a side of said electromagnet opposite to a side into which said plurality of mechanical fasteners thread.

10. Apparatus comprising:
a robot comprising a vehicle charging connector configured to establish an electrical connection with a charging port of a vehicle;
the robot further comprising an attachment module positioned adjacent to and spaced apart from the vehicle charging connector, the attachment module comprising a flexible body having a flexible outer sleeve constructed to enable vacuum attachment of the module to a vehicle; and
the robot further being constructed to apply a vacuum to the attachment module to attach the module to a vehicle.

11. The apparatus of claim 10 further comprising an electromagnet mounted within the flexible body and actuatable to enable attachment of the flexible body to a vehicle surface; and a protective pad mounted around said electromagnet and having a front protective surface positioned to contact a surface of the vehicle.

12. The apparatus of claim 10 wherein the flexible body is formed of silicone rubber and wherein the outer sleeve is circular in shape.

13. The apparatus of claim 11 wherein the flexible body is formed of silicone rubber and wherein the outer sleeve is circular in shape.

14. The apparatus of claim 11 wherein the electromagnet comprises a bobbin having an electrical winding mounted in a channel thereof.

15. The apparatus of claim 11 wherein the attachment module is attached to an arm which is mountable to the robot to enable rotation about a charging axis of the vehicle charging connector.

16. The apparatus of claim 15 wherein said arm is mountable on a ball joint positioned on said robot.

17. The apparatus of claim 15 wherein said arm is curved such that a portion thereof lies parallel to an axis of the vehicle charging connector.

18. Apparatus comprising:
   a robot comprising a vehicle charging connector configured to establish an electrical connection with a charging port of a vehicle;
   the robot further comprising an attachment module positioned adjacent to and spaced apart from the vehicle charging connector, the attachment module comprising a flexible body having a flexible outer sleeve; and
   an electromagnet mounted within the flexible body and actuatable to enable attachment of the flexible body to a vehicle surface.

19. The apparatus of claim 18 further comprising a protective pad mounted around said electromagnet and having a front protective surface positioned to contact a surface of the vehicle.

20. The apparatus of claim 18 wherein the flexible body is formed of silicone rubber and wherein the outer sleeve is circular in shape.

21. The apparatus of claim 19 wherein the electromagnet comprises a bobbin having an electrical winding mounted in a channel thereof.

22. The apparatus of claim 18 wherein the attachment module is attached to an arm which is mountable to the robot to enable rotation about a charging axis of the vehicle charging connector.

23. The apparatus of claim 22 wherein said arm is mountable on a ball joint positioned on said robot.

24. The apparatus of claim 22 wherein said arm is curved such that a portion thereof lies parallel to an axis of the vehicle charging connector.

25. A method of constructing a robot to charge an electric vehicle comprising:
   constructing the robot to include an attachment module actuatable to attach to a surface of the vehicle prior to insertion by the robot of an electrical charging connector into engagement with a charging port of the vehicle and such that the attachment module enables said insertion;
   further constructing the robot such that, after the attachment module is attached to the vehicle, the robot proceeds to insert the electrical charging connector into the charging port of the vehicle.

26. The method of claim 25 comprising further constructing the robot is to disconnect the charging connector from the vehicle charging port after charging and to thereafter detach the attachment module from the vehicle.

27. The method of claim 25 further comprising constructing the attachment module to enable the module to attach to the vehicle by applying a vacuum thereto.

28. The method of claim 25 further comprising constructing the attachment module to include an electromagnet configured to attach the module to a ferromagnetic vehicle surface.

29. The method of claim 27 further comprising constructing the attachment module to include an electromagnet configured to attach the module to a ferromagnetic vehicle surface.

* * * * *